Patented Dec. 21, 1948

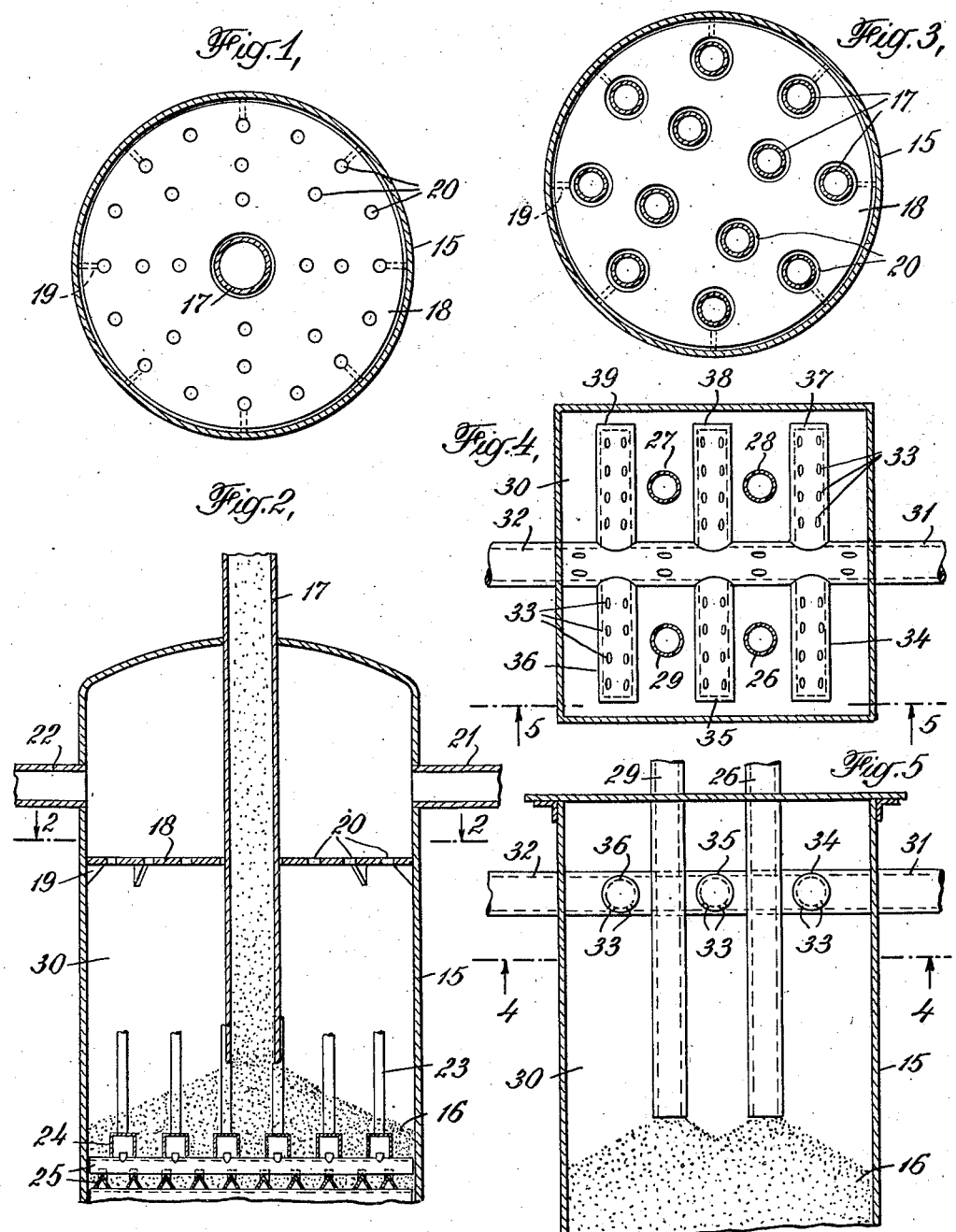

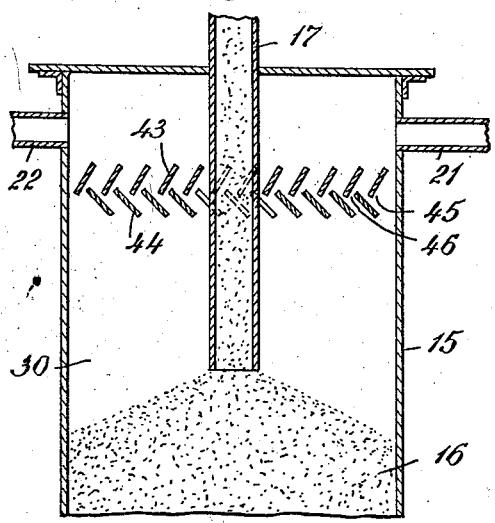
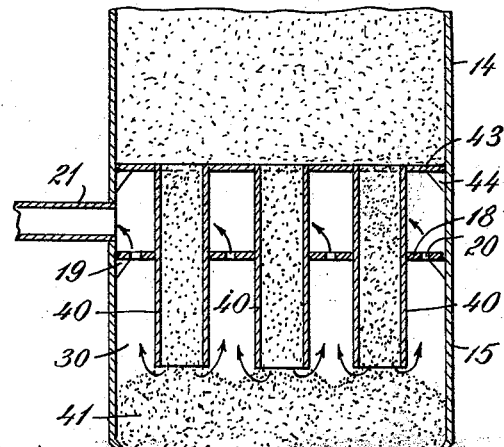
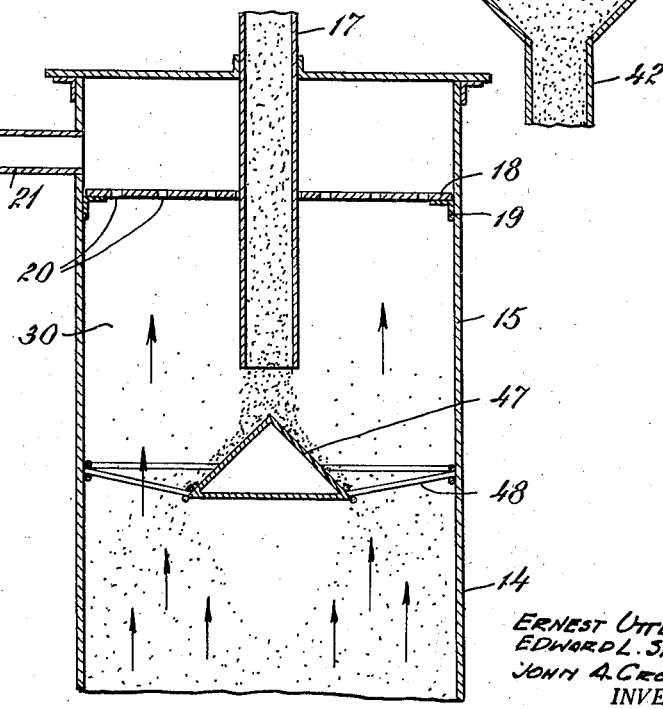

2,457,098

UNITED STATES PATENT OFFICE 2,457,098

APPARATUS FOR CONDUCTING REACTIONS IN THE PRESENCE OF A CONTACT MASS

Ernest Utterback, Upper Darby, and Edward L. Sinclair, Philadelphia, Pa., and John A. Crowley, Jr., Woodbury, N. J., assignors to Socony-Vacuum Oil Company, Incorporated, a corporation of New York Application July 29, 1943, Serial No. 496,648

6 Claims. (Cl. 23—288)

1

This invention has to do with apparatus for conducting reactions of fluid reactants such as hydrocarbon vapors in the presence of a moving bed of particle form solid contact mass material which may or may not be catalytic to the desired reaction. Exemplary of the processes of this kind is the cracking conversion of hydrocarbons, it being well known that hydrocarbons of a gas oil nature boiling between about 500° F. and about 750° F. may be substantially cracked to gasoline and lower boiling hydrocarbons by passing them at reaction conditions of temperature and pressure such as for example, temperatures of the order of 825° F. and above at pressures somewhat above atmospheric in contact with a solid adsorptive catalytic contact mass. Usually such contact masses partake of the nature of fuller's earth, or other natural or treated filtering clays and/or various synthetic associations of alumina, silica, or alumina and silica, any of which may or may not have other constituents added for a purpose in connection with the processes such as certain metallic oxides. In a most recent form this operation has been developed as one in which the particle form contact mass material is moved cyclically through two zones in the first of which it serves as a catalytic material for the reaction of concurrent or countercurrent flowing reactant fluids and in the second of which it is subjected to the action of concurrent or countercurrent flowing fluid regenerating mediums, such as a combustion supporting gas, acting to burn off contaminant materials deposited upon the contact mass in the reaction zone.

This invention has specifically to do with details of construction in connection with reactors and regenerators wherein fluid reactants are brought into contact with and subsequently separated from a moving stream of particle form solid contact mass material. Inasmuch as the function and operation of this invention is the same in reactors or regenerators, the term reactor will hereinafter in the explanation of the invention and in claiming the invention be used in a sense sufficiently broad to include fluid-solid contact apparatus regardless of exact purpose of use.

It is general practice in such a cyclic reactor-regenerator system as above described to continuously and cyclically circulate therethrough a particle form contact material of a specified range of particle sizes in which material may be small percentages of undersized contact particles which are either continuously or periodically removed from the contact material at some specified part of the system. It is generally undesirable to permit the carryover with the effluent reactant vapors from either the reactor or regenerator vessels of any appreciable quantities of normal or undersized contact material, as such carryover would necessitate additional dust separation apparatus and/or contaminate the condensed reaction products.

It is a major object of this invention to provide a means within reactor or regenerator vessels, such as described above, for the separation of reactant vapors or spent combustion gases from the contact material therein and the continuous removal of said vapors or gases from the reactor or regenerator vessels without appreciable entrainment or carryover in the vapor streams of particles of the contact material. The invention is specifically directed to details of construction and application of certain vapor flow distribution baffles or plates to be used in the vapor contact material disengaging section of reactor or regenerator vessels.

In order to readily understand this invention reference is made to the drawings attached hereto in which Figure 1 shows a plan view of such a distribution plate and Figure 2 is a sectional elevation view showing the application and arrangement of the baffle in the vapor outlet section of a reactor. Figure 3 is a plan view of a modified form of a vapor distribution plate. Figure 4 is a plan view, partially in section, showing the use of a branched pipe manifold which involves the same principle of design and purpose as the distribution plate; and Figure 5 is an elevation view, partially in section showing the installation of the above manifold in a regenerator vapor outlet section. Figure 6 is a sectional elevation view showing the use of specially arranged plate baffles which again involve the same principles of design and purpose as the distribution plate. Figures 7 and 8 show two different kinds of reactors and how the vapor flow distribution baffle would work in each. All of these drawings are diagrammatic in character.

Turning now to Figure 2, we find that 15 is the shell of a reactor used to confine a downwardly flowing stream of solid particle form contact material charged through pipe 17. The reactor here shown is packed with superimposed rows of inverted angle shaped baffles 25 interconnected by ports in the tops of the angles. The top row of these angles connects into channels 24 to the top of which are connected vapor jumper pipes 23. Thus a continuous shielded vapor passage is formed for the reactant vapors from the reaction zone up into the void disengaging space 30, through which passage the major portion of the reactant vapors may flow without having to bubble through the surface of the bed 16 of downwardly flowing contact material. Near the top of the reactor and to opposite sides are connected the two vapor outlet pipes 21 and 22. Just below these outlet pipes is the plate 18 which extends across the entire cross section of the reactor and which is supported by means of angle supports 19 connected to the reactor shell. The contact material feed pipe 17 extends through the center of this plate, and in the remainder of the area are drilled a number of holes of such a number and size and so uniformly distributed that the total area of the holes in given section of the plate is proportioned to the area of reactor cross section covered by that section of the plate. In Figure 1 we find a sectional plan view of the above plate 18 supported by braces 19. Uniformly spaced about the plate cross section are the holes 20. Although a number of circular holes 20 are shown drilled in the plate, holes or slots of other shape and holes varying in size would serve equally well in accomplishing their function provided they are uniformly distributed and proportioned to the reactor cross section controlled by them and provided their total area is within the proper limits, which are specified hereinafter. For example, in Figure 3 we find a sectional plan view of such a distribution plate 18 extending across a reactor 15, in which plate are drilled large diameter uniformly distributed round holes through the center of each of which extends a reactor contact material feed pipe 17 of an outside diameter somewhat less than that of the holes. Thus there remains a number of uniformly distributed annular spaces 20 in the plate through which the effluent reactant vapors must pass.

Turning again to Figure 2 for a study of the function and operation of this invention, the major part of the vapors from the reaction zone of the reactor pass up through the ports in the angles 25 to the channels 24 and then up through the jumper pipes 23 into the void space 30. That fraction of the vapors not reaching the void space 30 via this route reach it by passing directly up through the surface of the contact material bed 16. Both of these vapor streams tend to entrain and carry along some of the particle form contact material especially those particles of smallest size. It has been found that if the cross section of the void space 30 is sufficiently great to permit the velocity of the vapors passing up therethrough calculated on the space cross section to be below that required to float or carry the smallest particles of contact material the entrainment of which it is desired to prevent, and if the distance between the tops of the jumper pipes 23 and the vapor outlets 21 and 22 is adequate, most of the entrained contact material will settle to the top of the bed 16. The determination of the dimensions of the void disengaging space 30 is dependent upon a number of variables which need not be discussed herein, and the said dimensions are best determined experimentally. It can be said, however, that in all the applications of this invention the disengaging space used is to be considered as so designed as to be within the above broadly seated specifications. Since the linear velocity of vapor flow up through the disengaging space 30 is equal to the quotient of the total volume of vapor flowing per unit of time up from the jumper pipes 23 and the contact material bed 16 divided by the cross sectional area of the disengaging space, it is obvious that the vapor flow must be uniformly distributed across the entire disengaging space cross section if high and low velocity zones of flow are to be avoided. Normally if the baffle 18 of this invention is not used, the vapor flow from the jumper pipes 23 and/or the surface of the bed 16 will tend to be in a direct line from such pipes or bed toward the one, two or more outlet pipes such as 21 and 22 on the periphery or sides of the vessel. Thus instead of uniform vapor flow up through the disengaging space 30, high and low velocity zones of flow result, the condition becoming more aggravated as the outlet pipes 21 and 22 are approached; and the vapor velocity in said high velocity zones is sufficient to entrain and carry out from the reactor, in spite of the use of a disengaging space 30, particles of a size, the entrainment of which it is desirable to prevent. Furthermore, this condition becomes worse the larger the diameter of the vessel 15 used.

Consequently, it has been found necessary to insert near the top of the disengaging space 30 and near the outlet pipes 21 and 22 therefrom and between said outlet pipes and the tops of the jumper pipes 23 and/or the surface of the contact material bed 16, a baffle such as plate 18 in which are drilled a number of holes uniformly spaced and distributed and of such size as to cause a pressure drop due to the passage of the effluent vapors therethrough which pressure drop may be very low or which may be considerable but which must be substantially greater than the pressure drop due to the flow of the effluent vapors between the outlet of said holes in the baffle plate and the vapor outlet pipes 21 and 22. Due to this pressure drop through the orifice holes 20 in the baffle plate 18, the tendency of direct vapor flow between the tops of jumper pipes 23 and/or the surface of the bed 16 and the outlet pipes 21 and 22 is counteracted; and, since the holes in any section of the plate 18 are distributed so as to present an orifice area which is directly proportional to the area of the cross section of the disengaging space covered by that section of the plate, the vapor flows up through the disengaging space up to the plate 18 as an essentially single uniform zone of flow extending across the entire disengaging space cross section thereby substantially preventing entrainment from said disengaging space of contact material particles larger or equal to that minimum size which it is desirable to retain in this part of the cyclic system.

Not only are various modifications of orifice hole size, shape and arrangement possible within this invention, as above shown, but also various modifications of the baffle are possible. For example, Figure 4 is a view looking upwardly at a pipe manifold arrangement consisting of a pipe 31—32 passing across and extending out through two sides of a disengaging space 30 of square cross section, to which pipe within the disengaging space are perpendicularly connected a number of uniformly spaced branched pipes 34 through 39 inclusive, which extend across the cross section of the disengaging space. Along lines about 20° off the vertical plane through these pipes (31, 32 and 34–39 inclusive) on the lower sides thereof are drilled a number of uniformly spaced slots 33, all of which form an orifice pattern distributed uniformly with respect to the square disengaging space 30. Also extending down into this disengaging space are the four contact material feed pipes 26–29 inclusive. In Figure 5 we find an elevation view, partially in section of this installation in which 15 is the shell of the disengaging space and 26 and 29 are two of the contact material feed pipes through which the contact material charges to bed 16 at the bottom of the disengaging space 30. The contact material in the bed 16 flows continuously down into a reaction zone below, not shown. Also we find the pipes 31, 32, 34, 35 and 36 extend across the disengaging space near the top. In this arrangement all the effluent vapors pass up through the surface of the contact material bed 16 and up through the disengaging space 30 and then through the slots 33 into the pipes 31, 32, 34, 35 and 36 and also 37, 38 and 39 shown in Figure 4, and finally out through pipes 31 and 32. Obviously the greater the number of pipes used in such an arrangement, the more uniform will be the vapor flow up through the disengaging space 30. Although slots 33 are shown in this arrangement, the use of holes or apertures of any other shape is not precluded provided that they are properly distributed and that the pressure drop due to vapor flow therethrough is of the proper magnitude. Also the slots or holes might be placed on the upper side of the pipes rather than on the lower side and from this it can be seen that although the baffle and orifices, which in this instance are the walls of the pipes and the slots therein, must be between the bottom of the disengaging space and the outlet therefrom in the line of vapor flow, they need not necessarily be therebetween from an elevational standpoint.

Still another type of baffle and orifice arrangement is shown in Figure 6 in which 15 is the shell of the disengaging space, 17 is the contact material feed pipe through which contact material flows to bed 16 at the bottom of the disengaging space and then down into the reaction zone, and 21 and 22 are vapor outlet pipes on two opposite sides of the disengaging space. Just below the outlet pipes 21 and 22 are the two interlocking rows of baffle plates 43 and 44 each row consisting of a number of uniformly spaced flats the long sides of which are set at an angle with the horizontal preferably not less than 35°, which flats extend entirely across the disengaging space and are supported by the shell thereof on their two extreme ends by some suitable means not shown herein. The interlocking baffle arrangement thus obtained entirely closes off the cross section of the disengaging space except for the small apertures left between the nearly touching edges of the interlocking rows of plates or slats, which apertures extend along the entire length of the slats and across the entire width of the disengaging space cross section. By the uniform and proper spacing of the slats these apertures may be made to automatically constitute a pattern of uniformly spaced and distributed orifices for vapor passage, of such size and area as to cause the desired pressure drop on the passage of the effluent vapors therethrough.

Thus far the application of this invention has been shown only to reactors or vessels through which a substantially continuous column of downward moving particle form material continuously flows countercurrently to the flow of reactant vapors which are ultimately withdrawn from the top of the reaction zone. The invention may equally well be applied to reactors or vessels in which the contact material flows down through the reaction zone concurrently with the flow of reactant vapors, which are subsequently removed through a disengaging space below the said reaction zone. Such an arrangement is shown in Figure 7 in which 14 is the confining shell of the lower part of the reaction zone and pipes 40 are large drain pipes therefrom down through which the reactant vapors and contact material flow to the bed 41 at the bottom of the disengaging space 30. The vapor disengages from the contact material at the ends of the pipes 40 and at the surface of the bed 41 and passes up through space 30 and through the orifices 20 in the plate baffle 18 and then out through the outlet pipe 21.

Still another type reactor for which this invention may be used is shown in Figure 8 in which particle form contact material of relatively small size is charged through pipe 17 onto a conical shaped distributing baffle 47 supported from the shell 14 of the reactor by members 48. The contact material then slowly falls through the reaction zone as a dense rain countercurrent to a reactant vapor passing up therethrough at a velocity slightly less than that required to float and carry along the contact material. The vapor then passes up out of the reaction zone and through the disengaging space 30 and up through the orifices 20 in the baffle plate 18 and finally out through outlet pipe 21. In this instance the baffle plate and orifices not only serve to force a uniform flow of vapor up through the entire cross section of the disengaging space 30 thereby preventing entrainment of contact material out with the effluent vapors but also serve the very important function of forcing the flow of the reactant vapors up through the entire cross section of the reaction zone itself to be uniform. This is here possible because the pressure drop due to the flow of reactant vapors up through the unbaffled reaction zone of this type of reactor is very low and the uniformity of vapor flow would be greatly influenced by a localized vapor outlet passage such as pipe 21 unless the effect of this localized outlet connection is counteracted by the uniformly distributed orifices of the baffle arrangement of this invention.

In all the above described modified forms and applications of this invention the same broad principles and functions are involved, namely, the provision at or near the effective top of the vapor-solid disengaging space of a reactor or regeneration vessel through which a particle form solid contact material continuously flows in contact with a reactant vapor, of a baffle and orifice arrangment located so as to be in the path of vapor flow between the bottom of said disengaging space and the vapor outlet passage near the top of the disengaging vessel, in which baffle and orifice arrangement the orifices are uniformly spaced and distributed so as to present at any horizontal cross section of the disengaging space a total orifice area proportioned to the area of that section of the disengaging space and in which baffle and orifices arrangement the orifices are of such size, shape and area as to cause a pressure drop due to the flow of effluent vapors therethrough which is substantially greater than the pressure drop due to the flow of said effluent vapors between the outlet of said orifice baffle arrangement and the vapor outlet pipes from the disengaging vessel, the said baffle and orifice arrangement thereby effectively counteracting the disturbing influence of localized vapor outlet pipes on the uniform flow of effluent vapors up through the entire cross section of the disengaging space.

Since the desirable pressure drop through the baffle-orifice arrangement of this invention is dependent upon many variables inherent in the specific cyclic operation to which it is applied, such as the size and density of the particle-form contact material, the nature and properties of the reactant vapors, the total pressure and the temperature on the system and the pressure drop due to the flow of effluent vapors between the outlet of the orifice-baffle arrangement and the disengaging vessel vapor outlet pipes, it is obviously impossible to set any definite fixed dimensions or size for the orifices or slats in the baffle arrangements of this invention. Once the variables are known and once it is decided which type of the various modified forms of this invention is best adapted for the specific application, it is possible to calculate the number and size of the orifices and slats necessary to cause the required pressured drop. It is important, of course, that the slats or orifices be distributed uniformly across the entire disengaging space cross section and that the area of such slats in every section be proportional to the area of the disengaging space controlled by them. The pressure drop through the baffle-orifice arrangement may in some low pressure applications be as low as 1 or 2 inches of water and in other installations the upper range of the pressure drop across the said arrangement may be limited only by practical considerations.

Furthermore, since the vapor flow in that part of the disengaging vessel between the baffle-orifice arrangement and the vapor outlet pipes from the vessel will obviously not be uniformly distributed, it is practical to position the baffle-orifice arrangement as near as possible to the top of the disengaging space.

It should be understood that the details of construction and arrangement and the systems shown to which this invention may be applied are merely diagrammatic and exemplary in character and it is not intended that this invention be limited to the particular details shown or to the particular types of reaction vessels or systems herein described.

We claim:

1. In a reactor wherein gasiform hydrocarbons are contacted with a downwardly moving column of particle-form solid contact mass material, a substantially vertical reactor vessel having a substantially constant horizontal cross-sectional area along a major portion of its vertical length, conduit means adapted for substantially continuous introduction of contact material into said reactor extending downwardly into said reactor and extending vertically within said reactor a substantial distance within said major portion of the reactor length wherein the horizontal cross-sectional area is substantially constant, thereby providing within the upper section of said reactor above the lower extremity of said conduit means a substantially vertical straight gas disengaging space having a cross-sectional area for gas flow along its entire length substantially equal to the total cross-sectional area of that portion of said reactor which is below the lower extremity of said conduit means and which is occupied by a substantially compact column of said contact material, an outlet for hydrocarbons spaced substantially above the lower extremity of said conduit means, and between the level of said outlet and said disengaging space baffle means across said reactor defining the upper extremity of said disengaging space and adapted to provide a plurality of apertures substantially uniformly distributed with respect to the cross-sectional area of the reactor, said apertures having a total gas passage area sufficiently restricted to cause a substantial pressure differential between said disengaging space and said outlet.

2. In an apparatus wherein hydrocarbons are contacted with a substantially compact column of downwardly moving particle-form solid contact mass material, a vessel adapted for confining said solid material as a substantially compact column of downwardly moving particles and for passage of said hydrocarbons through said column, at least one feed conduit for solid material feed extending downwardly into said vessel to a level a substantial distance below the upper end of said vessel thereby defining a gas-solid disengaging space within the upper section of said vessel, an outlet for said hydrocarbons near the upper end of said vessel, baffle means across said vessel at a level shortly below said hydrocarbon outlet and substantially above the lower end of said solid feed conduit, said baffle means defining the upper extremity of said disengaging space and said baffle means being adapted to provide a plurality of apertures for gas flow substantially uniformly distributed across the cross-section of said disengaging space, said apertures having a total gas passage area sufficiently restricted to cause a substantial pressure differential between said disengaging space and said outlet.

3. The apparatus of claim 2 in which the baffle means is a partition plate extending entirely across the reactor, and provided with a plurality of relatively small orifices distributed substantially uniformly over its surface.

4. The apparatus of claim 2 in which the baffle means is a branched pipe manifold extending from said outlet in such manner that orifices in said pipe manifold are substantially uniformly distributed with respect to the reactor cross section.

5. The apparatus of claim 2 in which the baffle means is composed of a horizontal assembly of sloped flats extending from side to side of the reactor, the slats therebetween forming the orifices.

6. In an apparatus wherein hydrocarbons are contacted with a downwardly moving substantially compact mass of particle form contact material, a vessel of substantially constant cross-sectional area along its vertical length adapted for confining said solid material as a substantially compact column and for passage of said hydrocarbons through said column, at least one feed conduit for solid materal feed extending downwardly into said vessel to a level a substantial distance below the upper end of said vessel thereby defining a gas-solid disengaging space within the upper section of said vessel, an outlet for said hydrocarbons near the upper end of said vessel, said disengaging space being substantially straight and vertical and free of baffles, a partition across said vessel at a level shortly below said hydrocarbon outlet and substantially above the lower end of said solid feed conduit and within that portion of the vessel length wherein its cross-sectional area is substantially constant, said partition defining the top of said disengaging space, a plurality of apertures in said partition uniformly distributed across its area, said apertures being of substantial size but being sufficiently restricted in total gas passage area to cause a substantial pressure differential between said disengaging space and said hydrocarbon outlet.

ERNEST UTTERBACK.
EDWARD L. SINCLAIR.
JOHN A. CROWLEY, Jr.

(References on following page)

REFERENCES CITED

The following references are of record in the file of this patent:

UNITED STATES PATENTS

| Number | Name | Date |
|---|---|---|
| 1,845,058 | Pier | Feb. 16, 1932 |
| 2,231,424 | Huppke | Feb. 11, 1941 |
| 2,259,487 | Payne | Oct. 21, 1941 |
| 2,348,156 | Sheppard | May 2, 1944 |
| 2,359,310 | Hemminger | Oct. 3, 1944 |
| 2,367,281 | Johnson | Jan. 16, 1945 |

FOREIGN PATENTS

| Number | Country | Date |
|---|---|---|
| 543,838 | Great Britain | Mar. 16, 1942 |

Certificate of Correction

Patent No. 2,457,098. December 21, 1948.

ERNEST UTTERBACK ET AL.

It is hereby certified that error appears in the printed specification of the above numbered patent requiring correction as follows:

Column 3, line 70, for the word "seated" read *stated*;

and that the said Letters Patent should be read with this correction therein that the same may conform to the record of the case in the Patent Office.

Signed and sealed this 31st day of May, A. D. 1949.

[SEAL]

THOMAS F. MURPHY,
*Assistant Commissioner of Patents.*